United States Patent [15] 3,644,718

Osborne et al. [45] Feb. 22, 1972

[54] PULSE-COUNTING ARRANGEMENTS

[72] Inventors: Colin Terry Osborne; Michael Keith Burdett, both of Bradford, Yorkshire, England

[73] Assignee: The English Electric Company Limited, London, England

[22] Filed: May 20, 1969

[21] Appl. No.: 826,250

[30] Foreign Application Priority Data

May 20, 1968 Great Britain.......................23,888/68

[52] U.S. Cl.....................235/92 EA, 235/92 R, 235/92 DN, 235/92 CC

[51] Int. Cl.........................................................H03k 21/18

[58] Field of Search......................................235/92; 328/50

[56] References Cited

UNITED STATES PATENTS

| | | | |
|---|---|---|---|
| 3,063,631 | 11/1962 | Ray | 235/92 |
| 2,561,512 | 7/1951 | Holmes et al. | 235/92 |
| 3,050,857 | 8/1962 | Pierce et al. | 235/92 |
| 3,422,422 | 1/1969 | Frank et al | 235/92 |

*Primary Examiner*—Daryl W. Cook
*Assistant Examiner*—Joseph M. Thesz, Jr.
*Attorney*—Misegades & Douglas, Keith Misegades and George R. Douglas, Jr.

[57] ABSTRACT

In a counting circuit, pulses from a counting pulse source are counted during a counting period and the count is transferred into a display at the start of the next counting period where it remains until the end of that period. The circuit includes a primary counter having a number of successive stages arranged to count the pulses, but during the transfer operation the pulses are counted by a secondary counter instead of by the lowest order primary counter stage and a carry is entered into the second primary counter stage when the count in the secondary counter reaches the capacity of the lowest order primary counter stage. Thereafter the primary counter stages again count the pulses in the normal manner.

In one application of the counter, the number of pulses generated during a counting period gives a measure of the diameter of a workpiece, and the display provides a direct indication of the diameter. The start of each counting period is determined by a trigger pulse generated by rotation of the workpiece.

7 Claims, 2 Drawing Figures

PULSE-COUNTING ARRANGEMENTS

This invention relates to pulse-counting arrangements.

According to the invention, a pulse-counting arrangement includes primary pulse-counting means from which a representation of the number of pulses counted during a predetermined counting period is read out at the beginning of a next succeeding counting period, and secondary pulse-counting means operable in place of said primary counting means to count said pulses during the reading out of said representation.

One embodiment of the invention will now be described, by way of example, with reference to the accompanying drawings, in which.

Figure 1:
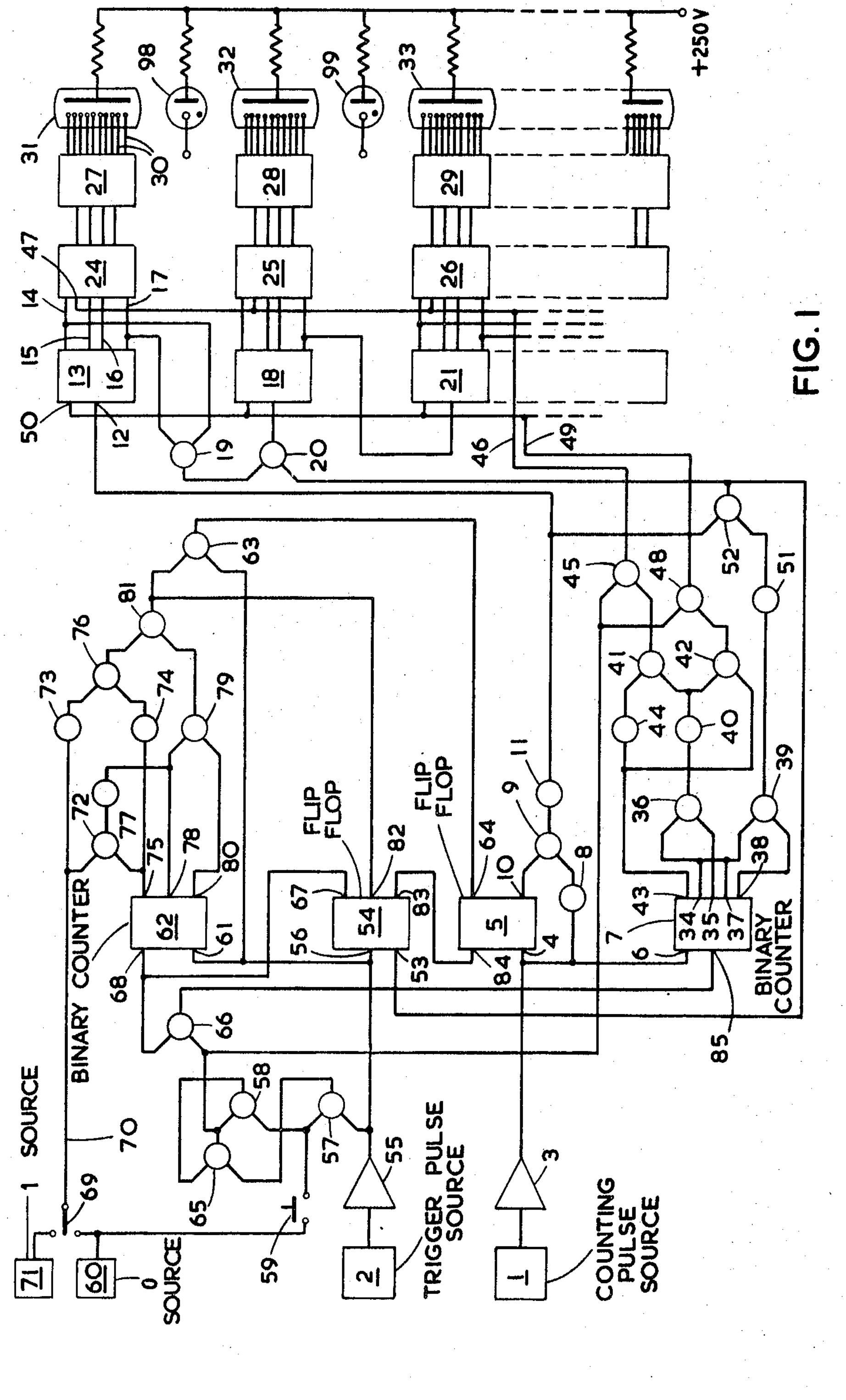
FIG. 1 is a block schematic diagram of a pulse-counting arrangement in accordance with the invention.

Referring now to FIG. 1 of the drawings, a pulse-counting arrangement is arranged to count pulses from a pulse source 1 during a counting period which is defined by trigger pulses from a trigger pulse source 2.

The source 1 is connected through an amplifier 3 to an input terminal of a flip-flop 5, to an input terminal 6 of a binary counter 7 and to one input of a Nand-gate 8. The gate 8, and each of the other two-input Nand gates which will be mentioned below, produces an output of binary '1' significance only if either or both of the input signals applied to the gate is a binary '0' significance. The input signals of binary '0' and '1' significance may be, respectively, zero voltage and a voltage of sufficient magnitude to operate the circuit. Where only one input of a Nand gate is shown in FIG. 1, the other input is permanently connected to a signal of '1' significance.

The output of the gate 8 is connected to one input of a Nand-gate 9, the other input of which is connected to an output terminal 10 of the flip-flop 5. The output of the gate 9 is connected to one input of a Nand-gate 11, the output of which is connected to a terminal 12 of the lowest decade stage 13 of a pulse counter. The stage 13 provides, on output lines 14, to 17, a binary-coded representation of the count in the stage. The next lowest decade stage 18 of the counter is connected to the stage 13 via Nand-gates 19 and 20. The third stage 21 is connected to the stage 18, and as many more counting stages may be provided as are required to deal with the total number of pulses expected during a counting period.

Each stage 13, 18, 21 etc., is connected to a corresponding stage 24, 25, 26 etc., respectively, which is arranged to receive the binary count in the corresponding stage 13, 18, 21 etc., at the end of each counting period and to store the count for the duration of the next counting period. The binary-coded elements are passed from the stages 24, 25, 26, etc., to corresponding stages 27, 28, 29 etc., of a binary-coded to decimal converter. One of 10 output lines 30 is energized in each stage 27, 28, 29 etc., in dependence upon the final pulse count stored in that stage in a counting period. The energized output line causes operation of the corresponding section of a digital display tube 31, 32 or 33 etc.

Output terminal 35 of the counter 7 is connected to an input of a Nand-gate 36, and terminals 37 and 38 are similarly connected to a Nand-gate 39. The terminal 37, is also connected to input terminal 34 of counter 7. The output of the gate 36 is connected to one input of a Nand-gate 40, the output of which is connected to the inputs of two Nand-gates 41 and 42. An output terminal 43 of the counter 7 is connected to the other input of the gate 42 and to an input of a Nand-gate 44, the output of which is connected to one input of the gate 41. The output of the gate 41 is connected to one input of a Nand-gate 45, the output of which provides a "latch count" signal which is fed on a line 46 to an input terminal 47 of the stage 24 and to corresponding input terminals of the stages 25, 26 etc.

The output of the gate 42 is connected to one input of a Nand-gate 48, the output of which provides a "reset count" signal on a line 49 which is connected to an input terminal 50 of the stage 13 and to corresponding input terminals of the stages 18, 21 etc. The output of the gate 39 is connected to one input of a Nand-gate 51, the output of which is connected to an input of a Nand-gate 52. The other input of the gate 52 receives pulses from the output of the gate 11. The output of the gate 52 is connected to an input terminal 53 of a flip-flop 54 to the other input of the gate 20.

The trigger pulse source 2 passes timing pulses through an amplifier 55 to another input terminal 56 of the flip-flop 54 and to an input of a Nand-gate 57. The other input of the gate 57 and one input of a Nand-gate 58 are connected to a normally open contact of a "manual reset" switch 59. The other contact of the switch 59 is connected to an '0' source 60. The output of the amplifier 55 is also connected to an input terminal 61 of a binary counter 62 and to an input of a Nand-gate 63, the output of which is connected to an input terminal 64 of the flip-flop 5.

The output of the gate 57 is connected to an input of a Nand-gate 65, the other input of which is connected to the output of the gate 58. The output of the gate 65 is connected to the other input of the gate 58, to an input of a Nand-gate 66, and to the other inputs of the gates 45 and 48. An output terminal 67 of the flip-flop 54 is connected to the other input of the gate 66 and to an input terminal 68 of the counter 62.

A switch 69 is arranged to connect a line 70 either to the '0' source 60 or to a '1' source 71. The line 70 is connected to one input of a Nand-gate 72 and to one input of a Nand-gate 73. The other input of the gate 72 and one input of a Nand-gate 74 are connected to an output terminal 75 of the counter 62. The outputs of the gates 73 and 74 are connected, respectively, to the two inputs of a Nand-gate 76. The output of the gate 72 is connected to one input of a Nand-gate 77, the output of which is connected to an input terminal 78 of the counter 62 and to an input of a Nand-gate 79. The other input of the gate 79 is connected to an output terminal 80 of the counter 62.

The outputs of the gates 76 and 79 are connected to the two inputs, respectively, of a Nand-gate 81, the output of which is connected to a terminal 82 of the flip-flop 54 and to the other input of the gate 63. An output terminal 83 of the flip-flop 54 is connected to an input terminal 84 of the flip-flop 5. An input terminal 85 of the counter 7 is connected to the output of the gate 66.

In operation of the pulse counting arrangement, pulses to be counted are generated by the source 1, amplified by the amplifier 3 and passed to the flip-flop 5. The operation of the flip-flop 5 may be summarized as follows. When the input at the terminal 4 changes from '0' to '1,' the output at terminal 10 will assume the same state as the input at terminal 84. When the input terminal 64 is changed from '1' to '0' the output at terminal 10 becomes '0.'

Similarly, the operation of the flip-flop 54 may be summarized as follows. When the input at terminal 56 changes from '0' to '1,' the output terminal 67 will assume the same state as the input at terminal 82, and the output at terminal 83 will assume the opposite state. When the input at terminal 53 is changed from '1' to '0' the output at terminal 67 becomes '0' and the output at terminal 83 becomes '1.'

The operation of the counter 7 is as follows. As the pulses to be counted are fed to the terminal 6, the output terminals 37, 35, 43 and 38, respectively, provide a binary-coded representation of the count, the terminals providing elements of '1,' '2,' '4' and '8' significance, respectively. A binary '1' signal applied to the terminal 85 inhibits the counter 7 and resets the output of the counter to zero.

The counter 62 operates similarly, the terminals 75 and 80 providing the '1' and '8' elements of the count only. The terminal 78 must be connected to the terminal 75 by way of the gates 72 and 77 for both code elements to appear. If the terminal 78 is not connected to the terminal 75 and if the terminal 68 is at '0,' only the '1' element will appear at terminal 75 and no output will appear at terminal 80.

If in operating the counting arrangement the switch 69 is now set to connect the line 70 to the '0' source 60, the counting arrangement will count the pulses generated by the source 1 in the period between successive trigger pulses in the following manner. When the switch 69 is in this position one input of each gate 72 and 73 is '0' and each of these gates therefore provides a '1' output.

If the "manual reset" switch 59 is now closed, a '0' signal is temporarily applied to one input of each of the gates 57 and 58, both of which therefore apply '1' signals to the inputs of the gate 65. The gate 65 therefore applies a '0' signal to the other input of the gate 58 and the gate 65 is latched in this condition. Since the '0' signal from the gate 65 is also applied to gates 66, 45 and 48, these gates latch into a '1' output condition.

The '1' signal from the gate 66, applied to the terminal 85, sets the outputs at terminals 37, 35, 43 and 38 all to zero. The '1' signal from the gate 48 resets the counter stages 13, 18, 21 etc., to zero, and the '1' signal from the gate 45 causes this zero to be passed through the stages 24, 25, 26 etc., to the stages 27, 28, 29 etc., thereby producing a zero indication in the display tubes 31, 32, 33 etc.

When the first trigger pulse thereafter is generated, the gate 57 produces a '0' output and the output of gate 65 therefore becomes '1.' The gates 45 and 48 revert to the '0' output condition and the "latch count" and "reset count" signals are therefore removed. If the output at terminal 67 is in the '0' state, the output of the gate 66 will be '0' and the counter 7 will be inhibited and the count will remain at zero until the next trigger pulse is generated. On the other hand, if the output at the terminal 67 is '1' the output of the gate 66 will be '0' and the counter 7 will then be ready to count the pulses from the generator 1 following the pulse counting sequence described below.

The second trigger pulse operates the flip-flop 54 and the gate 63. Since the line 70 is connected to the '0' source 60 and the terminal 75 is held at '0,' the gates 73 and 74 provide a '1' output. The gate 76 therefore provides a '0' output and the gate 81 applies a '1' signal to the terminal 82 of the flip-flop 54. The output terminal 67 therefore applies a '1' signal to the input terminal 68 of the counter 62 and to the gate 66. Both inputs of this gate are therefore '1' and the gate applies a '0' to the terminal 85 of the counter 7 which is then ready to count pulses from the source 1.

Both inputs of the gate 63 now have a '1' signal applied thereto, so the output of the gate 63 applies a '0' signal to the terminal 64 of the flip-flop 5. This sets the flip-flop terminal 10 at '1' and inhibits the gate 9 so that no counting pulses reach the stages 13, 18, 21 etc.

The counting sequence in the counter 7 is as follows.

The first and second counting pulses merely change the binary representations on the output terminals 37 and 35 of the counter 7.

The third counting pulse applies '1' signals to both inputs of the gate 36 which therefore applies a '0' signal to the gate 40. The '1' output of the gate 40 is applied to one input of the gate 41, the other input of which is also at '1' because the terminal 43 of the counter 7 is at '0.' The '0' output provided by the gate 41 causes the gate 45 to generate a "latch count" signal on the line 46 which causes the count formed in the stages 13, 18, 21 etc., during the counting period between the previous two trigger pulses to be transferred to the display tubes 31, 32, 33 etc.

The fourth counting pulse provides a '1' output on the terminal 43 and the terminals 35 and 37 revert to '0.' The gate 45 therefore reverts to '0.'

The fifth and sixth counting pulses merely change the states of the output terminals of the counter 7.

The seventh counting pulse provides a '1' output on terminals 37, 35 and 43, hence the gate 36 applies a '0' to the gate 40 which, in turn, applies a '1' to one input of the gate 42, the other input of which is also at '1.' The gate 42 therefore applies a '0' to the gate 48, causing a "reset count" signal to be fed on the line 49 to clear the stages 13, 18, 21 etc.

The eighth counting pulse removes the '1' signals from the terminals 37, 35 and 43 and the gate 48 reverts to a '0' output.

The ninth counting pulse provides '1' outputs on terminals 37 and 38, causing the gate 39 to apply a '0' signal to the gate 51. Gate 52 therefore applies a '0' signal to the terminal 53 of the flip-flop 54 and to the gate 20. The signal on the terminal 53 causes the flip-flop 54 to provide a '0' signal at terminal 67 which causes the gate 66 to apply a '1' signal to terminal 85 of the counter 7, thereby arresting the counting operation and resetting the outputs to '0.' This in turn, causes the gate 52 to revert to the '1' output state.

The tenth counting pulse then causes a count of one to be entered into the stage 18 through the gate 20, and subsequent pulses pass through the gates 8, 9 and 11 to the stages 13, 18, 21 etc., of the counter in the usual manner.

The next and subsequent trigger pulses will each restart the sequence set out above.

If the switch 69 had been set to connect the line 70 to the '1' source 71, the counting arrangement would count the pulses delivered by the source 1 over a period of 10 trigger pulses from the source 2, the operation then being as follows. The counting arrangement will operate in the manner described above until the application of the second trigger pulse. The terminal 67 of the flip-flop 54 and the terminals 75 and 80 of the counter 62 will then be at a '0' and the output of gate 81 will therefore also be at '0.'

The third to eighth trigger pulses merely change the states of the terminals 75 and 80.

The ninth trigger pulse will produce a '1' output at both terminal 75 and terminal 80, and the output of gate 81 will change to '1.' The input to terminal 82 of flip-flop 54 will also change to '1.'

The tenth trigger pulse will therefore change the output at terminal 67 to '1.' The transfer of the count to the display tubes 31, 32, 33 etc., and the resetting to zero of all the stages 13, 18, 21 etc., will then proceed as described above.

To summarize, the counting arrangement therefore provides a means of counting pulses produced during a period between two successive trigger pulses and reading out the count to the display tubes 31, 32, 33 etc., at the beginning of the next counting period. The count then remains on the display tubes until the end of the next counting period. Pulses which might otherwise be missed during the transfer operation are counted by the secondary counter 7 instead of by the stage 13, and at the end of 10 pulses a carry is entered into the second stage 18 of the primary counter. Thereafter the primary counter stages 13, 18, 21 etc., again count the pulses in the normal manner. For the counting arrangement to operate in this way, there must clearly be at least 10 counting pulses during each counting period.

Alternatively, the count may be made over a period of 10 trigger pulses, or by the provision of suitable circuits, the counting period may be made to include any number of trigger pulses.

The "manual reset" switch 59 provides a means of resetting the count to zero. The count will then restart at the next trigger pulse. The display tubes 31, 32, 33 etc., will then display zero for the whole of the next counting period and will then indicate the count resulting from that period.

The pulse-counting arrangement may be used to count pulses generated by any source, but merely by way of example, the application of the arrangement to measuring apparatus of the kind described in our copending U.S. Pat. application Ser. No. 813,966 will now be briefly described.

Figure 2:
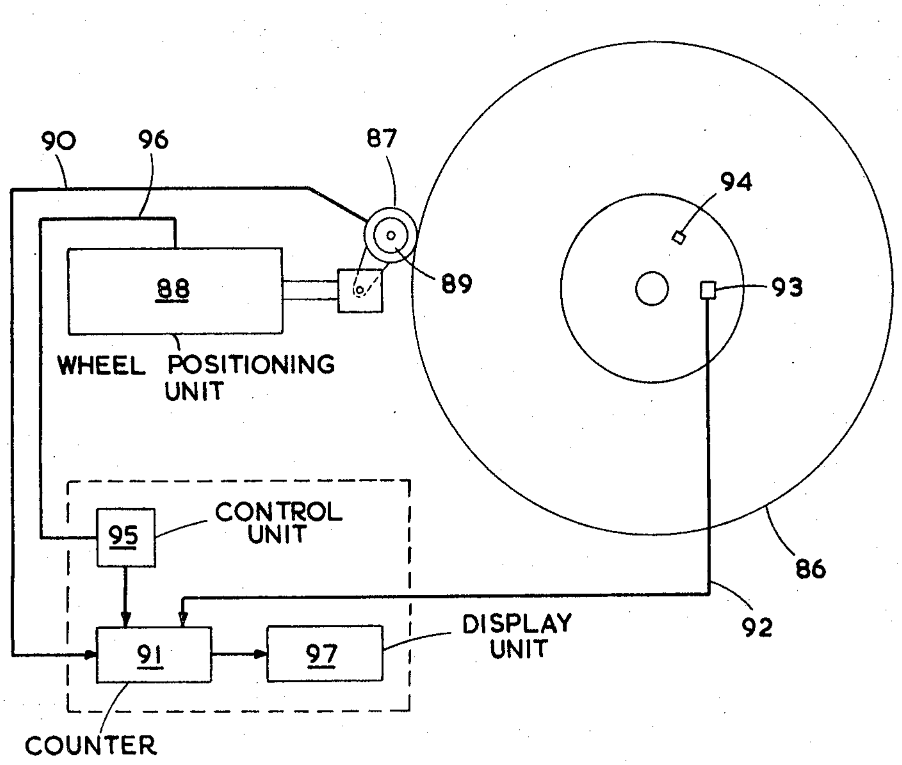
FIG. 2 is a block schematic diagram of diameter-measuring apparatus incorporating the pulse-counting arrangement.

Referring now to FIG. 2 of the drawings, which is a block schematic diagram of such apparatus, the outside or inside diameter of a workpiece 86, which is rotated in a machine such as a lathe or a boring machine (not shown), is measured by apparatus which includes a measuring wheel 87 which is urged into contact with the surface of the workpiece 86 by a wheel-positioning unit 88 attached to a toolpost (not shown) on the machine.

During rotation of the wheel 87, pulses are generated by a pulse generator 89 and are passed over a line 90 to a pulse counter 91. The pulse generator 89 may be of any suitable kind and may be, for example, an optical grating arrangement. An amplifier may be included in the generator 89 in order to obtain a high signal/noise ratio.

The completion of each revolution of the workpiece 86 is signalled to the counter 91 by a trigger pulse passed over a line 92 from a transducer 93 each time a marker 94 passes the transducer 93. The transducer may, for example, include a lamp and a photocell which is energized by light from the lamp only when the marker 94 passes the transducer 93. The marker 94 may then be a piece of reflective material attached to the workpiece 86, to the work-holder of the machine, or to another part of the machine which revolves in synchronism with the workpiece 86. The transducer 93 may, alternatively, be for example, a magnetic transducer, the marker 94 then being formed of magnetic material.

The counter 91 counts the total number of pulses generated by the generator 89 during a complete revolution of the workpiece 86. The diameter of the wheel 87 and the number of pulses generated during each revolution of the wheel 87 are so arranged that this total number of pulses is a direct indication of the workpiece diameter. Alternatively, by adjustment of a control unit 95, a slower but more accurate measurement of the diameter can be obtained during ten revolutions of the workpiece 86.

The counter 91 is arranged to transfer the total count at the end of each measuring period into a display unit 97 which gives a visual indication of the diameter of the workpiece 86. The counting arrangement of the present invention may form the counter 91 and the display unit 97. The counting pulse source of FIG. 1 then corresponds to the generator 89 and the trigger pulse source 2 corresponds to the transducer 93. The switch 69 of FIG. 1 would then be included in the control unit 95 to change to the 10 revolution count. Indicator lamps, such as the lamps 98 and 99 (FIG. 1) may be positioned between the tubes 31, 32, 33 etc., and may be selectively operable to indicate the position of a decimal point.

The circuit elements in the pulse-counting arrangement may be of any suitable kind.

We claim:

1. A pulse-counting arrangement including primary pulse-counting means for counting pulses; auxiliary storage means; indicating means providing a digital representation of the number of pulses counted during a predetermined counting period at the beginning of a next succeeding counting period; and a single decade counter, said single decade counter being operable in place of said primary pulse-counting means for counting pulses during the transfer of a count from said primary pulse counting means into said auxiliary storage means for visual indication of said count by said indicating means, said primary pulse-counting means including at least first and second successive counting stages, and in which operation of said first counting stage is inhibited during reading out, and a carry is entered into said second stage when said single decade counter has counted a number of pulses equal to the capacity of said first stage.

2. A pulse-counting arrangement as claimed in claim 1, in which, after counting a predetermined number of pulses, said single decade counter generates a signal to initiate said reading out.

3. A pulse-counting arrangement as claimed in claim 1, in which, after counting a predetermined number of pulses, said single decade counter generates a signal to clear the count in said pulse-counting means.

4. A pulse-counting arrangement as claimed in claim 1, including manual resetting means arranged to reset said representation to zero, and to cause said indicating means to display a zero indication during the next counting period.

5. A pulse-counting arrangement as claimed in claim 1, including means to count trigger signals from a train of said trigger signals and to initiate each succeeding counting period after the counting of a predetermined number of said trigger signals.

6. A pulse-counting arrangement as claimed in claim 5, including means to generate said pulses in dependence upon a dimension of an object; and means to generate said trigger signals in response to rotation of said object.

7. A pulse-counting arrangement as claimed in claim 1, including means to generate said pulses in dependence upon a dimension of an object.

* * * * *